(12) United States Patent
Jaffrey et al.

(10) Patent No.: US 9,410,392 B2
(45) Date of Patent: Aug. 9, 2016

(54) WIRELESS MEASUREMENT OF THE POSITION OF A PISTON IN AN ACCUMULATOR OF A BLOWOUT PREVENTER SYSTEM

(71) Applicant: Cameron International Corporation, Houston, TX (US)

(72) Inventors: Andrew Jaffrey, Oldmeldrum (GB); Jon Davies, Dorchester (GB)

(73) Assignee: Cameron International Corporation, Houston, TX (US)

( * ) Notice: Subject to any disclaimer, the term of this patent is extended or adjusted under 35 U.S.C. 154(b) by 539 days.

(21) Appl. No.: 13/671,777

(22) Filed: Nov. 8, 2012

(65) Prior Publication Data

US 2014/0123746 A1    May 8, 2014

(51) Int. Cl.
*E21B 33/06* (2006.01)
*E21B 47/00* (2012.01)
*E21B 33/035* (2006.01)

(52) U.S. Cl.
CPC .............. *E21B 33/06* (2013.01); *E21B 33/0355* (2013.01); *E21B 47/0001* (2013.01)

(58) Field of Classification Search
CPC ...... E21B 33/06; E21B 33/061; E21B 33/062
See application file for complete search history.

(56) References Cited

U.S. PATENT DOCUMENTS

| | | | | |
|---|---|---|---|---|
| 4,542,652 A | * | 9/1985 | Reuter | B60G 17/01933 367/13 |
| 5,024,250 A | * | 6/1991 | Nakamura | F15B 1/08 138/104 |
| 6,005,395 A | * | 12/1999 | Chan | F15B 15/2869 324/635 |
| 6,374,913 B1 | | 4/2002 | Robbins et al. | |
| 2005/0257630 A1 | * | 11/2005 | Gilbert | G01N 1/10 73/863.84 |
| 2008/0196888 A1 | | 8/2008 | Judge et al. | |
| 2009/0127482 A1 | | 5/2009 | Bamford | |
| 2009/0139724 A1 | * | 6/2009 | Gray | E21B 23/04 166/345 |
| 2010/0152901 A1 | | 6/2010 | Judge et al. | |
| 2010/0171637 A1 | | 7/2010 | Jaffrey et al. | |
| 2011/0177779 A1 | | 7/2011 | Rhodes et al. | |
| 2011/0304218 A1 | | 12/2011 | Hyland et al. | |
| 2011/0308795 A1 | | 12/2011 | Hyland et al. | |
| 2011/0308796 A1 | | 12/2011 | Hyland et al. | |
| 2012/0000646 A1 | | 1/2012 | Liotta et al. | |
| 2012/0098674 A1 | | 4/2012 | McStay et al. | |
| 2012/0186874 A1 | | 7/2012 | Malone et al. | |

FOREIGN PATENT DOCUMENTS

| | | |
|---|---|---|
| GB | 2477034 A | 7/2011 |
| GB | 2478761 A | 9/2011 |
| GB | 2481303 A | 12/2011 |
| GB | 2481304 A | 12/2011 |
| GB | 2481305 A | 12/2011 |
| WO | 2011/114152 A2 | 9/2011 |

OTHER PUBLICATIONS

International Search Report and Written Opinion dated Feb. 21, 2014 for PCT Application No. PCT/US2013/068749 filed Nov. 6, 2013.

\* cited by examiner

*Primary Examiner* — Peter Macchiarolo
*Assistant Examiner* — Nathaniel Kolb
(74) *Attorney, Agent, or Firm* — Eubanks PLLC (57) ABSTRACT

A measurement system including a container including an element moveable within an internal volume of the container. A sensor wirelessly measures the position of the element within the container and transmits the measured position information. Also included is an information system capable of reading the position information from the sensor.

20 Claims, 5 Drawing Sheets

WIRELESS MEASUREMENT OF THE POSITION OF A PISTON IN AN ACCUMULATOR OF A BLOWOUT PREVENTER SYSTEM

BACKGROUND

In most offshore drilling operations, a wellhead at the sea floor is positioned at the upper end of the subterranean wellbore lined with casing, a blowout preventer (BOP) stack is mounted to the wellhead, and a lower marine riser package (LMRP) is mounted to the BOP stack. The upper end of the LMRP typically includes a flex joint coupled to the lower end of a drilling riser that extends upward to a drilling vessel at the sea surface. A drill string is hung from the drilling vessel through the drilling riser, the LMRP, the BOP stack, and the wellhead into the wellbore.

During drilling operations, drilling fluid, or mud, is pumped from the sea surface down the drill string, and returns up the annulus around the drill string. In the event of a rapid invasion of formation fluid into the annulus, commonly known as a "kick," the BOP stack and/or LMRP may actuate to help seal the annulus and control the fluid pressure in the wellbore. In particular, the BOP stack and the LMRP include closure members, or cavities, designed to help seal the wellbore and prevent the release of high-pressure formation fluids from the wellbore. Thus, the BOP stack and LMRP function as pressure control devices.

For most subsea drilling operations, hydraulic fluid for operating the BOP stack and the LMRP is provided using a common control system physically located on the surface drilling vessel. However, the common control system may become inoperable, resulting in a loss of the ability to operate the BOP stack. As a backup, or even possibly a primary means of operation, hydraulic fluid accumulators are filled with hydraulic fluid under pressure. The amount and size of the accumulators depends on the anticipated operation specifications for the well equipment.

An example of an accumulator includes a piston accumulator, which includes a hydraulic fluid section and a gas section separated by a piston moveable within the accumulator. The hydraulic fluid is placed into a fluid section of the accumulator and pressurized by injecting gas (typically Nitrogen) into the gas section. The fluid section is connected to a hydraulic circuit so that the hydraulic fluid may be used to operate the well equipment. As the fluid is discharged, the piston moves within the accumulator under pressure from the gas to maintain pressure on the remaining hydraulic fluid until full discharge.

The ability of the accumulator to operate a piece of equipment depends on the amount of hydraulic fluid in the accumulator and the pressure of the fluid. Thus, there may be a need to know the volume of the hydraulic fluid remaining in an accumulator so that control of the well equipment may be managed. Measuring the volume of hydraulic fluid in the accumulator over time can also help identify if there is a leak in the accumulator or hydraulic circuit or on the gas side of the piston.

Currently, the ability of an accumulator to power equipment is determined by measuring the pressure in the hydraulic circuit downstream of the accumulator. However, pressure is not an indicator of the overall capacity of an accumulator to operate equipment because the volume of hydraulic fluid remaining in the accumulator is not known. Also, accumulators are typically arranged in banks of multiple accumulators all connected to a common hydraulic circuit, therefore, the downstream pressure measurement is only an indication of the overall pressure in the bank, not per individual accumulator.

A possible way of determining the volume of hydraulic fluid remaining in the accumulator is to use a linear position sensor such as a cable-extension transducer or linear potentiometer that attaches inside the accumulator to measure the movement of the internal piston. However, these electrical components may fail and because the discharge of hydraulic fluid may be abrupt, the sensors may not be able to sample fast enough to obtain an accurate measurement.

Another method of determining the volume of hydraulic fluid is through the use of physical position indicators that extend from the accumulator. These indicators only offer visual feedback though and are insufficient for remote monitoring and pose a significant challenge to maintaining the integrity of the necessary mechanical seals under full operating pressures.

Through-the-wall sensors (e.g., Hall effect sensors) have also been considered. However, the thickness and specifications of an accumulator wall is such that these types of sensors are not always able to penetrate the material.

BRIEF DESCRIPTION OF THE DRAWINGS

For a detailed description of the preferred embodiments of the invention, reference will now be made to the accompanying drawings in which.

DETAILED DESCRIPTION

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce the desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 1:
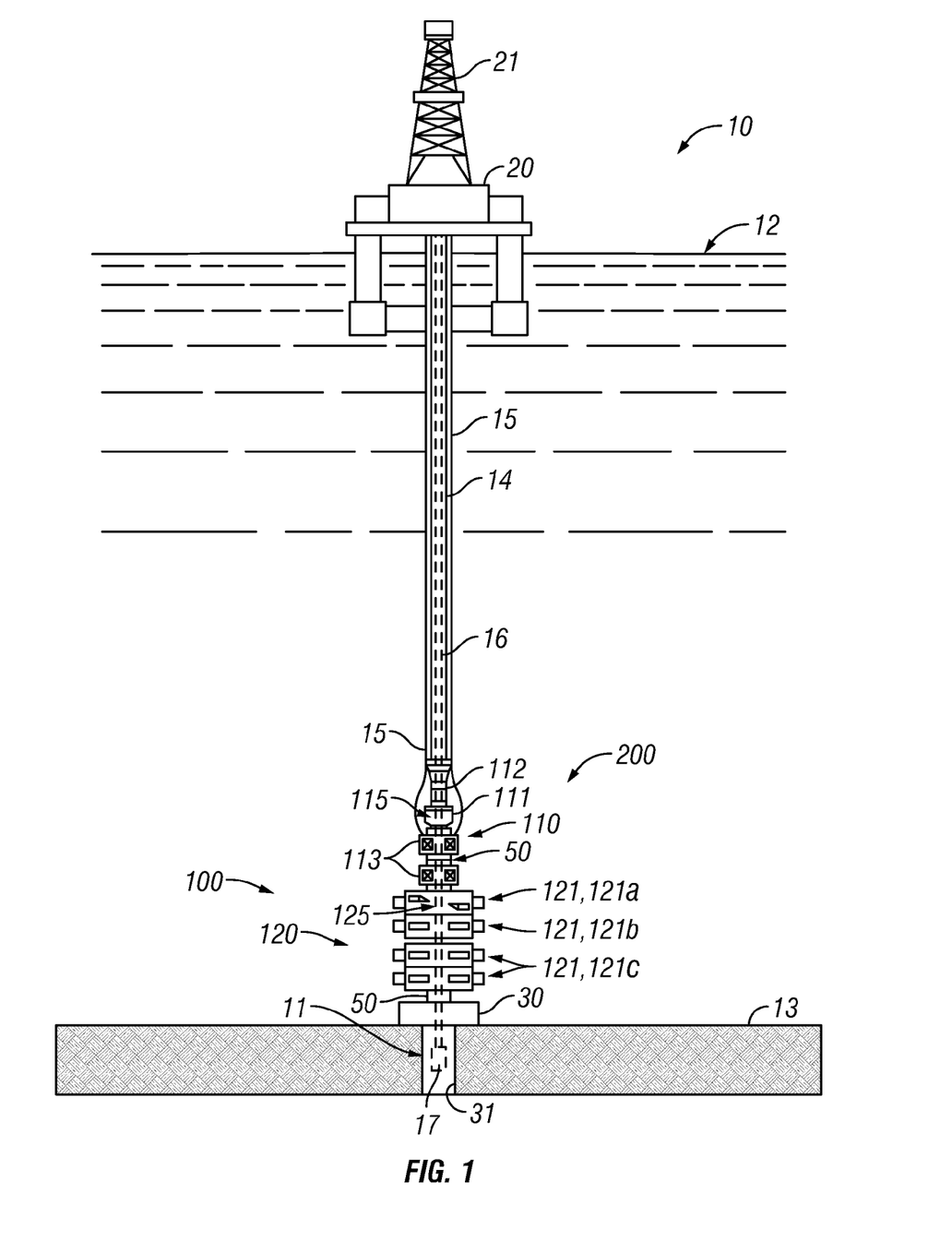
FIG. 1 shows a schematic view of an offshore system for drilling and/or producing a subterranean wellbore with an embodiment of a measurement system.

Referring now to FIG. 1, an embodiment of an offshore system 10 for drilling and/or producing a wellbore 11 is shown. In this embodiment, the system 10 includes an offshore vessel or platform 20 at the sea surface 12 and a subsea BOP stack assembly 100 mounted to a wellhead 30 at the sea floor 13. The platform 20 is equipped with a derrick 21 that supports a hoist (not shown). A tubular drilling riser 14 extends from the platform 20 to the BOP stack assembly 100. The riser 14 returns drilling fluid or mud to the platform 20 during drilling operations. One or more hydraulic conduit(s) 15 extend along the outside of the riser 14 from the platform 20 to the BOP stack assembly 100. The conduit(s) 15 supply pressurized hydraulic fluid to the assembly 100. Casing 31 extends from the wellhead 30 into the subterranean wellbore 11.

Downhole operations are carried out by a tubular string 16 (e.g., drillstring, production tubing string, coiled tubing, etc.) that is supported by the derrick 21 and extends from the platform 20 through the riser 14, through the BOP stack assembly 100, and into the wellbore 11. A downhole tool 17 is connected to the lower end of the tubular string 16. In general, the downhole tool 17 may comprise any suitable downhole tool(s) for drilling, completing, evaluating, and/or producing the wellbore 11 including, without limitation, drill bits, packers, cementing tools, casing or tubing running tools, testing equipment, perforating guns, and the like. During downhole operations, the string 16, and hence the tool 17 coupled thereto, may move axially, radially, and/or rotationally relative to the riser 14 and the BOP stack assembly 100.

Figure 2:
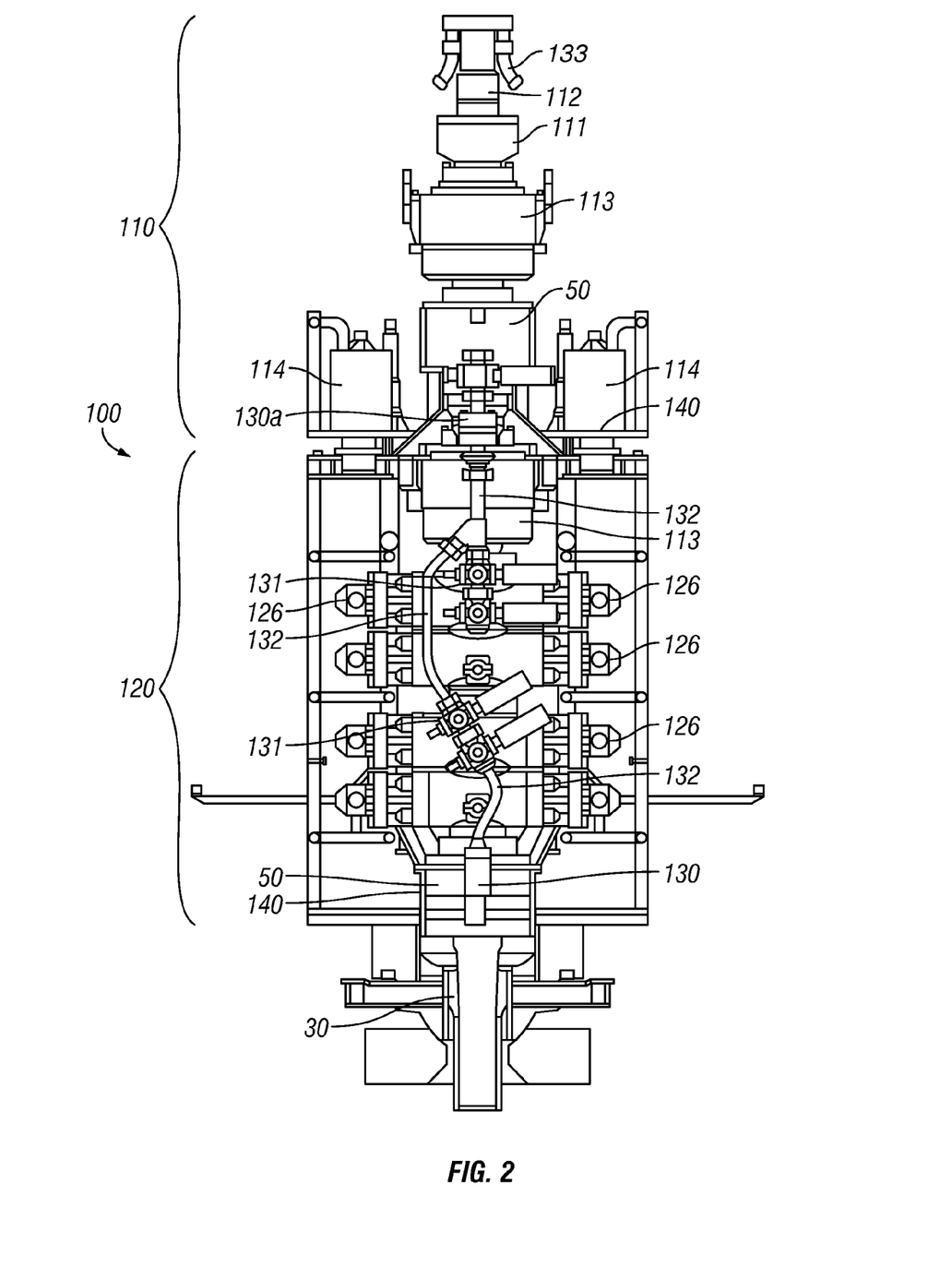
FIG. 2 shows an elevation view of the subsea BOP stack assembly and measurement system of FIG. 1.
Figure 3:
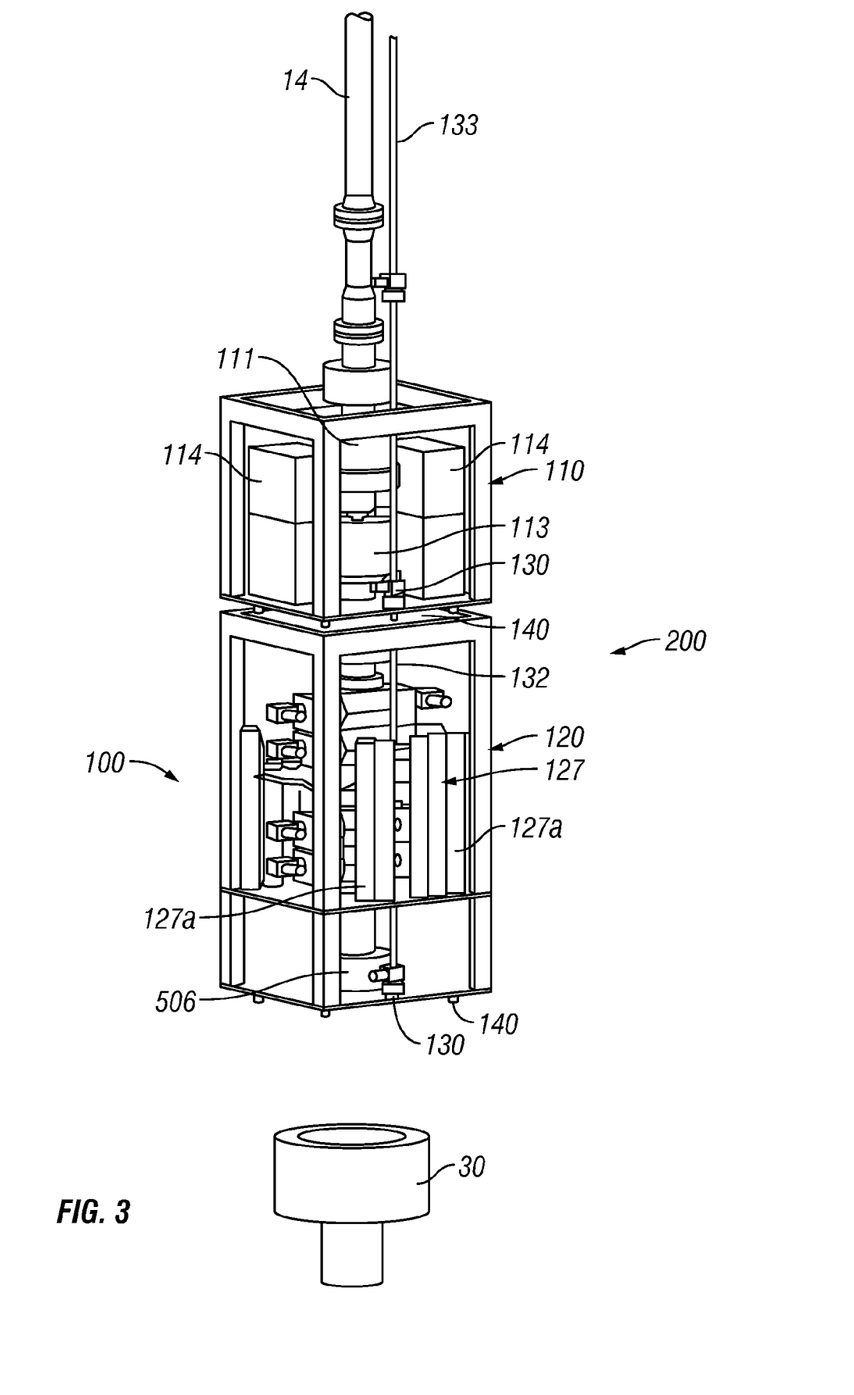
FIG. 3 shows a perspective view of the subsea BOP stack assembly and measurement system of FIGS. 1 and 2.

Referring now to FIGS. 1-3, the BOP stack assembly 100 is mounted to the wellhead 30 and is designed and configured to control and seal the wellbore 11, thereby containing the hydrocarbon fluids (liquids and gases) therein. In this embodiment, the BOP stack assembly 100 comprises a lower marine riser package (LMRP) 110 and a BOP or BOP stack 120.

The BOP stack 120 is releasably secured to the wellhead 30 as well as the LMRP 110 and the LMRP 110 is releasably secured to the BOP stack 120 and the riser 14. In this embodiment, the connections between the wellhead 30, the BOP stack 120, and the LMRP 110 include hydraulically actuated, mechanical wellhead-type connections 50. In general, the connections 50 may comprise any suitable releasable wellhead-type mechanical connection such as the DWHC or HC profile subsea wellhead system available from Cameron International Corporation of Houston, Tex., or any other such wellhead profile available from several subsea wellhead manufacturers. Typically, such hydraulically actuated, mechanical wellhead-type connections (e.g., the connections 50) include an upward-facing male connector or "hub" that is received by and releasably engages a downward-facing mating female connector or receptacle 50b. In this embodiment, the connection between LMRP 110 and the riser 14 is a flange connection that is not remotely controlled, whereas the connections 50 may be remotely, hydraulically controlled.

Referring still to FIGS. 1-3, the LMRP 110 includes a riser flex joint 111, a riser adapter 112, an annular BOP 113, and a pair of redundant control units or pods 114. A flow bore 115 extends through the LMRP 110 from the riser 14 at the upper end of the LMRP 110 to the connection 50 at the lower end of the LMRP 110. The riser adapter 112 extends upward from the flex joint 111 and is coupled to the lower end of the riser 14. The flex joint 111 allows the riser adapter 112 and the riser 14 connected thereto to deflect angularly relative to the LMRP 110 while wellbore fluids flow from the wellbore 11 through the BOP stack assembly 100 into the riser 14. The annular BOP 113 comprises an annular elastomeric sealing element that is mechanically squeezed radially inward to seal on a tubular extending through the LMRP 110 (e.g., the string 16, casing, drillpipe, drill collar, etc.) or seal off the flow bore 115. Thus, the annular BOP 113 has the ability to seal on a variety of pipe sizes and/or profiles, as well as perform a "Complete Shut-off" (CSO) to seal the flow bore 115 when no tubular is extending therethrough.

In this embodiment, the BOP stack 120 comprises an annular BOP 113 as previously described, choke/kill valves 131, and choke/kill lines 132. The choke/kill line connections 130 connect the female choke/kill connectors of the LMRP 110 with the male choke/kill adapters of the BOP stack 120, thereby placing the choke/kill connectors of the LMRP 110 in fluid communication with the choke lines 132 of the BOP stack 120. A main bore 125 extends through the BOP stack 120. In addition, the BOP stack 120 includes a plurality of axially stacked ram BOPs 121. Each ram BOP 121 includes a pair of opposed rams and a pair of actuators 126 that actuate and drive the matching rams. In this embodiment, the BOP stack 120 includes four ram BOPs 121—an upper ram BOP 121 including opposed blind shear rams or blades 121a for severing the tubular string 16 and sealing off the wellbore 11 from the riser 14; and the three lower ram BOPs 120 including the opposed pipe rams 121c for engaging the string 16 and sealing the annulus around the tubular string 16. In other embodiments, the BOP stack (e.g., the stack 120) may include a different number of rams, different types of rams, one or more annular BOPs, or combinations thereof. As will be described in more detail below, the control pods 114 operate the valves 131, the ram BOPs, and the annular BOPs 113 of the LMRP 110 and the BOP stack 120.

The opposed rams 121a, c are located in cavities that intersect the main bore 125 and support the rams 121a, c as they move into and out of the main bore 125. Each set of rams 121a, c is actuated and transitioned between an open position and a closed position by matching actuators 126. In particular, each actuator 126 hydraulically moves a piston within a cylinder to move a connecting rod coupled to one ram 121a, c. In the open positions, the rams 121a, c are radially withdrawn from the main bore 125. However, in the closed positions, the rams 121a, c are radially advanced into the main bore 125 to close off and seal the main bore 125 (e.g., rams 121a) or the annulus around the tubular string 16 (e.g., 121c). The main bore 125 is substantially coaxially aligned with the flow bore 115 of the LMRP 110, and is in fluid communication with the flow bore 115 when the rams 121a, c are open.

As best shown in FIG. 3, the BOP stack 120 also includes a set or bank 127 of hydraulic accumulators 127a mounted on the BOP stack 120. While the primary hydraulic pressure supply is provided by the hydraulic conduits 15 extending along the riser 14, the accumulator bank 127 may be used to support operation of the rams 121a, c (i.e., supply hydraulic pressure to the actuators 126 that drive the rams 121a, c of the stack 120), the choke/kill valves 131, the connector 50b of the BOP stack 120, and the choke/kill connectors 130 of the BOP stack 120. As will be explained in more detail below, the accumulator bank 127 serves as a backup means to provide hydraulic power to operate the rams 121a, c, the valves 131, the connector 50b, and the connectors 130 of the BOP stack 120.

Although the control pods 114 may be used to operate the BOPs 121 and the choke/kill valves 131 of the BOP stack 120 in this embodiment, in other embodiments, the BOPs 121 and the choke/kill valves 131 may also be operated by one or more subsea remotely operated vehicles (ROVs).

As previously described, in this embodiment, the BOP stack 120 includes one annular BOP 113 and four sets of rams (one set of shear rams 121a, and three sets of pipe rams 121c). However, in other embodiments, the BOP stack 120 may include different numbers of rams, different types of rams, different numbers of annular BOPs (e.g., annular BOP 113), or combinations thereof. Further, although the LMRP 110 is shown and described as including one annular BOP 113, in other embodiments, the LMRP (e.g., LMRP 110) may include a different number of annular BOPs (e.g., two sets of annular BOPs 113). Further, although the BOP stack 120 may be referred to as a "stack" because it contains a plurality of ram BOPs 121 in this embodiment, in other embodiments, BOP 120 may include only one ram BOP 121.

Both the LMRP 110 and the BOP stack 120 comprise re-entry and alignment systems 140 that allow the LMRP 110-BOP stack 120 connections to be made subsea with all the auxiliary connections (i.e. control units, choke/kill lines) aligned. The choke/kill line connectors 130 interconnect the choke/kill lines 132 and the choke/kill valves 131 on the BOP stack 120 to the choke/kill lines 133 on the riser adapter 112. Thus, in this embodiment, the choke/kill valves 131 of the BOP stack 120 are in fluid communication with the choke/kill lines 133 on the riser adapter 112 via the connectors 130. However, the alignment systems 140 are not always necessary and need not be included.

As shown in FIGS. 3-6, the subsea BOP stack assembly 100 further includes a measurement system 200, which includes at least one container (e.g., the hydraulic accumulators 127a mounted on the BOP stack 120), at least one sensor 210, and an information system 220.

Figure 4:
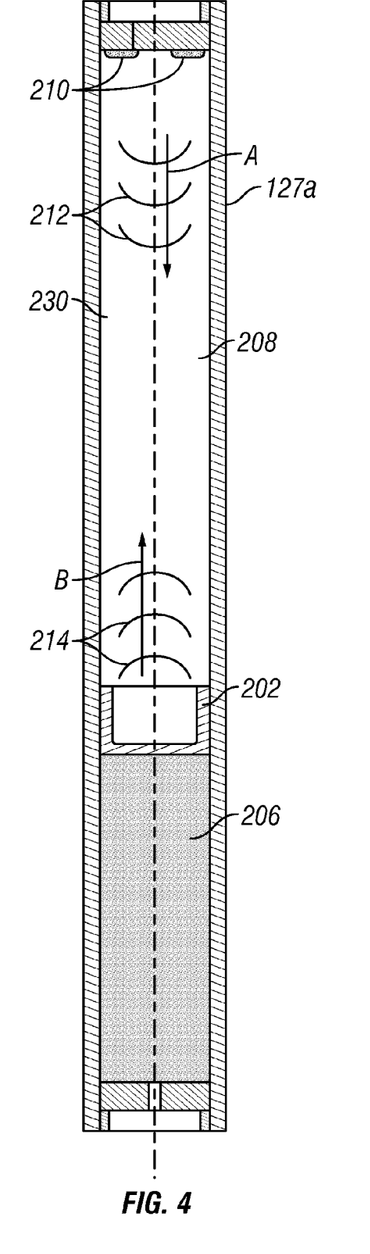
FIG. 4 shows a cross section view of an embodiment of a container with a sensor for use with the measurement system.
Figure 5:
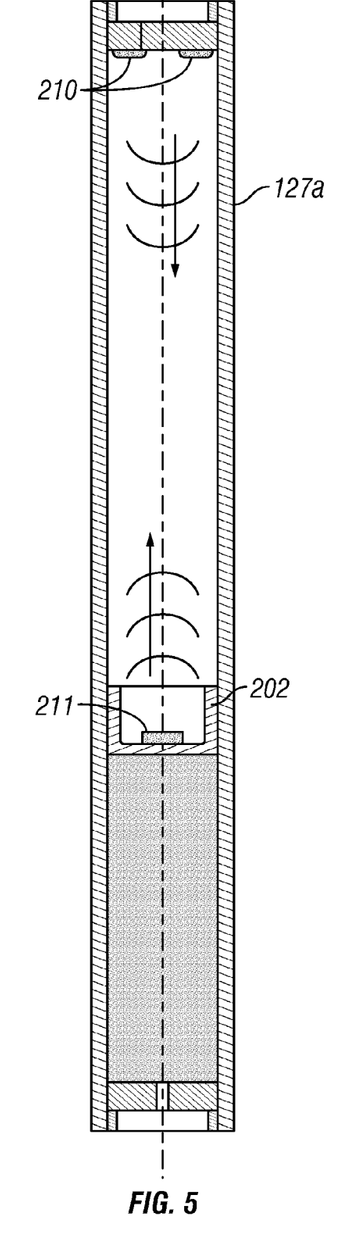
FIG. 5 is a cross section view of an alternative container with sensor for use in the measurement system.

In this embodiment, the containers are the hydraulic accumulators 127a, which are piston-type accumulators that include an element 202 moveable within their internal volume, or cavity, 230. In this case, the moveable elements 202 are the pistons separating the hydraulic fluid 206 from the gas 208 within the internal volumes of the accumulators 127a. It should be appreciated by those of skill in the art that the containers may be any type of container with an internal volume and an element moveable within the internal volume.

The measurement system 200 includes at least one sensor 210 that wirelessly measures the position of the element 202 within the container(s) and transmits the measured position information. As shown in FIG. 4, the sensor may be installed inside an end cap of the container 127a and the container 127a may contain more than one sensor 210. The sensor 210 may also be any suitable type of sensor. For example, the sensor 210 may be a radio-frequency, a far field electromagnetic (microwave), a near field electromagnetic, or an acoustic sensor capable of using one or more techniques (including but not limited to carrier phase detection) related to wave propagation and reflection characteristics to determine the distance between a position in the container (e.g., the inside face of the end cap) and the moveable element 202. For example, the sensor 210 propagates electromagnetic waves 212 in the direction indicated by the arrow A. The waves travel through the internal volume of the container on the gas side of the movable element 202 and reflect off the moveable element 202, resulting in reflection waves 214 traveling in the direction indicted by arrow B back to the sensor 210. The sensor 210 receives the reflected waves and measures the distance to the moveable element. The sensor 210 can also transmit the position information as an analog or digital signal for storage or processing. The sensor 210 may measure at any suitable frequency rate, e.g. as 1 Hz, for taking accurate position measurements.

Examples of measurement techniques include, but are not limited to, cavity resonance, time of flight, phase measurement, and backscatter modulation techniques which may be exploited directly or indirectly. For example, the sensor 210 may use a cavity resonance approach and measure natural resonance frequencies determined by the cylinder diameter and cavity 230 length. The cavity 230 length changes with position of the element 202 and the corresponding change in resonance frequency can be translated to element 202 displacement via an inverse square range law. As a further example, the sensor 210 may operate using a phase reflectometry approach where a phase comparator is used to compare transmitted and reflected signal phase. Element 202 displacement serves to alter the phase relationship and this can be translated to element 202 displacement by a linear range law. Both methods require knowledge of electromagnetic propagation speed in the gas medium 208.

On the gas 208 side of the element 202, microwave propagation speed is a function of gas permittivity. Gas permittivity increases as the gas pressure is increased and this serves to reduce microwave propagation speed. Thus, propagation speed should be taken into account to reduce measurement errors due to the large variation and high absolute value of pressure experienced in the container 127a during its operational cycle.

As an example, if the container 127a is cylindrical, a proposed solution to in-situ propagation speed measurement is to use the cylindrical cavity radial resonance modes which are a function of the cylinder diameter only. The diameter of the cylinder is known so the frequency of resonance for these modes can be used to estimate propagation speed to high precision and so account for variations in propagation speed with gas pressure change. In this manner, the sensor 210 can self-calibrate to account for variations in propagation speed related to changes in pressure of the gas in the container 127a. An additional feature of this approach is that the measured propagation speed can be related directly to cavity pressure, and so the sensor 210 can be used to provide both element 202 range and cavity pressure measurement data.

Furthermore, the sensor 201 may operate combining the resonance approach, the phase approach, or any of the other techniques.

FIG. 5 shows an alternative embodiment further including a transponder 211 attached to the moveable element 202. The transponder 211 communicates with the sensor 210 by retransmitting the signal received from the sensor 210. The transponder 211 may also be any suitable type for communicating with the sensor 210. For example, the sensor 210 may be a radio-frequency transceiver and the transponder 211 may be a radio-frequency identification (RFID) tag located on the element 202. The sensor 210 would then take measurements by sending a radio-frequency signal to the RFID tag 211 and processing the response signal from the RFID tag 211 to determine the position of the element 202. This processing can be done using any appropriate technique, such as time of flight, phase variance, or any other suitable technique. As an example, if the sensor 210 and the RFID tag 211 operate by passive RFID communication, the sensor 210 may use backscatter modulation, i.e., the modulation of the transponder antenna radar cross section.

The RFID transponder(s) 211 may include active or passive RFID technology, even within the same container 127a. The RFID transponders 211 may also transmit signals at the same or different frequencies to differentiate the signals. Further, an active RFID transponder 211 may include an antenna, a battery, a microchip, and a memory device. During use, the antenna may receive and transmit signals. The battery enables an active RFID transponder 211 to transmit communications over distances that a passive RFID transponder cannot. The microchip processes incoming and outgoing communications and may communicate with the memory. The microchip may be an application specific microchip specifically designed for RFID applications or a general-purpose microchip. In some embodiments, the microchip may include a memory within the chip, rather than communicate with an external memory. The memory may store information for transmission information system 220 or possibly other RFID transponders. Similar to an active RFID transponder, a passive RFID transponder also may include an antenna, microchip, and memory.

The sensors 210 may operate by transmitting a first communication to the RFID transponder 211 to wake up the RFID transponder 211. A second communication may then be used to communicate position or other data. Once the information is communicated, another signal may be used to shut down any active RFID transponders 211.

With multiple containers 127a, each with a moveable element 202, the transponders 211 may be included on one, some, or all of the moveable elements 202, depending on how many accumulators are being monitored. The transponders 211 may also include identification functionality such that they are capable of communicating with the sensor 210 to identify each element 202 from the other elements 202, preventing interference across accumulators. Using this configuration, there may be a sensor 210 for each container 127a or there may be a sensor 210 (or sensors) outside the containers 127a that communicates with more than one transponder 211. In this manner, there may be fewer sensors 210 than containers 127a, with the potential for as little as one sensor 210 for the entire measurement system 200.

In addition to measuring position, the measurement system 200 may also include a sensor 210 for measuring temperature within the internal volume of the container 127a. Because the temperature of the internal volume may change with a sudden change in pressure, measuring the temperature adds additional information regarding the remaining volume of hydraulic fluid in the accumulator 127a.

Figure 6:
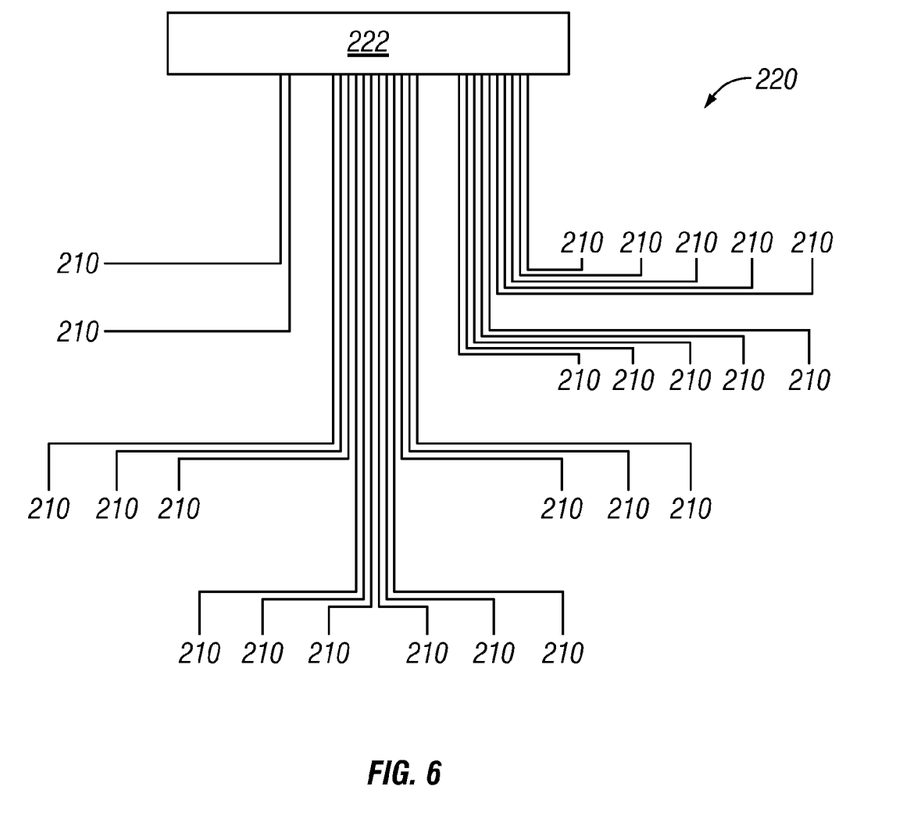
FIG. 6 is a schematic view of the measurement system, including the information system.

As shown in more detail in FIG. 6, the measurement system 200 further includes an information system 220 capable of receiving the position information from the sensor(s) 210. To collect the measurement information, the information system 220 includes an information hub 222 in communication with the sensors 210 to receive the measurement signals. The information hub 222 collects, processes, stores, and/or retransmits the measurement information from the sensors 210 using any suitable means. If the information hub 222 is used to store information, the information hub 222 may include a suitable memory device.

Although the present invention has been described with respect to specific details, it is not intended that such details should be regarded as limitations on the scope of the invention, except to the extent that they are included in the accompanying claims.

What is claimed is:

1. A measurement system, including:
   a container including an element moveable within an internal volume of the container, wherein the element includes a piston moveable within an internal volume of a hydraulic fluid accumulator, the piston dividing the internal volume into a first chamber having hydraulic fluid and a second chamber having a gas with the volumes of the first and second chambers depending on the position of the piston;
   a sensor capable of wirelessly measuring the position of the piston within the hydraulic fluid accumulator and transmitting the measured position information, wherein the sensor is installed on a stationary portion of the accumulator, is positioned at a fixed location within the second chamber to emit a wireless signal from the sensor through the gas toward the piston for measuring the position of the piston within the accumulator, and is capable of providing pressure measurement data for the second chamber within the hydraulic fluid accumulator between the piston and the sensor based on the emitted wireless signal; and
   an information system capable of reading the position information from the sensor.

2. The system of claim 1, further including:
   a radio-frequency identification (RFID) tag located on the element; and
   the sensor including a radio-frequency transceiver capable of sending a radio-frequency signal to the RFID tag and reading a response signal from the RFID tag.

3. The system of claim 1, wherein the sensor is at least one of a radio-frequency sensor, a far field electromagnetic (microwave) sensor, a near field electromagnetic sensor, and an acoustic sensor.

4. The system of claim 1, further including:
   more than one container including a moveable element;
   transponders located on each element and capable of communicating with the sensor to identify each element from the other elements.

5. The system of claim 1, wherein the information system includes an information hub located remotely from the sensors.

6. The system of claim 1, further including a sensor capable of measuring the temperature inside the container and transmitting the measured temperature information to the information system.

7. The system of claim 1, wherein the container, sensor, and information system are all locatable subsea.

8. The system of claim 1, further including:
   more than one container including a moveable element;
   sensors capable of wirelessly measuring the position of the elements within the containers and transmitting the measured position information; and
   the information system capable of reading the position information from the sensors.

9. The system of claim 1, wherein the sensor installed on the stationary portion of the accumulator and positioned at the fixed location within the second chamber is capable of self-calibration to account for variations in propagation speed related to changes in pressure of the gas in the container.

10. The system of claim 8, wherein the containers, sensors, and information system are all locatable subsea.

11. A measurement system, including:
blowout preventers (BOPs) configured in a blowout preventer (BOP) stack;
a hydraulic fluid accumulator mounted on the BOP stack and including a piston moveable within an internal volume of the accumulator, the piston dividing the internal volume into a first chamber having hydraulic fluid and a second chamber having a gas with the volumes of the first and second chambers depending on the position of the piston, and the accumulator being capable of providing the hydraulic fluid from the first chamber to operate a BOP of the BOP stack;
a sensor capable of wirelessly measuring the position of the piston within the accumulator and transmitting the measured position information, wherein the sensor is installed on a stationary portion of the accumulator, is positioned at a fixed location within the second chamber to emit a wireless signal from the sensor through the gas toward the piston for measuring the position of the piston within the accumulator, and is capable of providing pressure measurement data for the second chamber within the hydraulic fluid accumulator between the piston and the sensor based on the emitted wireless signal; and
an information system capable of reading the position information from the sensor.

12. The system of claim 11, further including:
a radio-frequency identification (RFID) tag located on the piston; and
the sensor including a radio-frequency transceiver capable of sending a radio-frequency signal to the RFID tag and reading a response signal from the RFID tag.

13. The system of claim 11, wherein the sensor is at least one of a radio-frequency sensor, a far field electromagnetic (microwave) sensor, a near field electromagnetic sensor, and an acoustic sensor.

14. The system of claim 11, further including:
more than one accumulator including a piston;
transponders located on each piston and capable of communicating with the sensor to identify each piston from the other pistons.

15. The system of claim 11, wherein the information system includes an information hub located remotely from the sensors.

16. The system of claim 11, further including a sensor capable of measuring the temperature inside the accumulator and transmitting the measured temperature information to the information system.

17. The system of claim 11, wherein the BOP stack is a subsea BOP stack and the hydraulic fluid accumulator, sensor, and information system are all locatable subsea.

18. The system of claim 11, further including:
more than one accumulator including a piston;
sensors capable of wirelessly measuring the position of the pistons within the accumulators and transmitting the measured position information; and
the information system capable of reading the position information from the sensors.

19. The system of claim 11, wherein the sensor installed on the stationary portion of the accumulator and positioned at the fixed location within the second chamber is capable of self-calibration to account for variations in propagation speed related to changes in pressure of the gas in the accumulator.

20. The system of claim 19, wherein the BOP stack is a subsea BOP stack and the hydraulic fluid accumulator, sensor, and information system are all locatable subsea.

* * * * *